US012141109B2

(12) United States Patent
Dasari

(10) Patent No.: US 12,141,109 B2
(45) Date of Patent: Nov. 12, 2024

(54) SYSTEMS AND METHODS FOR BUILDING AND PUBLISHING SCHEMAS BASED ON DATA PATTERNS AND DATA FORMATS

(71) Applicant: JPMORGAN CHASE BANK, N.A., New York, NY (US)

(72) Inventor: Srinu Dasari, Euless, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 224 days.

(21) Appl. No.: 17/505,542

(22) Filed: Oct. 19, 2021

(65) Prior Publication Data

US 2023/0124333 A1 Apr. 20, 2023

(51) Int. Cl.
 *G06F 16/21* (2019.01)
 *G06F 16/25* (2019.01)
 *G06F 16/28* (2019.01)
 *G06F 40/20* (2020.01)

(52) U.S. Cl.
 CPC .......... *G06F 16/213* (2019.01); *G06F 16/258* (2019.01); *G06F 16/285* (2019.01); *G06F 40/20* (2020.01)

(58) Field of Classification Search
 CPC .... G06F 16/213; G06F 16/258; G06F 16/285; G06F 40/20; G06F 16/1794; G06F 40/30
 See application file for complete search history.

(56) References Cited

U.S. PATENT DOCUMENTS

| | | | | | |
|---|---|---|---|---|---|
| 5,819,086 | A | * | 10/1998 | Kroenke | G06F 16/284 |
| | | | | | 715/764 |
| 6,601,026 | B2 | * | 7/2003 | Appelt | G06F 16/313 |
| | | | | | 707/E17.084 |
| 7,698,170 | B1 | * | 4/2010 | Darr | G06Q 30/02 |
| | | | | | 705/26.35 |
| 8,949,293 | B2 | * | 2/2015 | Morsi | G06F 16/21 |
| | | | | | 707/812 |
| 11,475,364 | B2 | * | 10/2022 | Kalluri | G06N 20/00 |
| 11,621,310 | B2 | * | 4/2023 | Kim | H10K 59/80521 |
| | | | | | 257/40 |
| 2004/0254963 | A1 | * | 12/2004 | Bradley | G06F 16/40 |
| 2005/0060324 | A1 | * | 3/2005 | Johnson | G06Q 30/06 |
| 2005/0216482 | A1 | * | 9/2005 | Ponessa | G06Q 30/04 |
| 2007/0282873 | A1 | * | 12/2007 | Ponessa | G06Q 10/06 |

(Continued)

*Primary Examiner* — Hosain T Alam
*Assistant Examiner* — Cecile H Vo
(74) *Attorney, Agent, or Firm* — GREENBERG TRAURIG LLP

(57) ABSTRACT

Systems and methods for building and publishing schemas based on data patterns and data formats are disclosed. According to one embodiment, a method for building and publishing schemas may include: (1) accessing, by a schema recommendation program executed by a computer processor, a plurality of ingested objects in an object store; (2) extracting, by a data crawler, metadata from each of the plurality of ingested objects, wherein the metadata is related to a schema for the object and comprises an object name, a field name, and a field type; (3) identifying, by the data crawler, a plurality of potential schemas for the plurality of ingested objects based on the metadata; (4) receiving, by the schema recommendation program, a selection of one of the plurality of potential schemas; and (5) publishing, by the schema recommendation program, the selected potential schema to a catalog store.

16 Claims, 2 Drawing Sheets

(56) References Cited

U.S. PATENT DOCUMENTS

| | | | |
|---|---|---|---|
| 2008/0027830 A1* | 1/2008 | Johnson | G06Q 30/0641 |
| | | | 707/E17.116 |
| 2012/0158799 A1* | 6/2012 | Morsi | G06F 16/21 |
| | | | 707/812 |
| 2014/0214594 A1* | 7/2014 | Singh | G06Q 30/0633 |
| | | | 705/26.7 |
| 2014/0222625 A1* | 8/2014 | Swanson | G06Q 30/0601 |
| | | | 705/27.1 |
| 2017/0193093 A1* | 7/2017 | Byron | G06F 16/3344 |
| 2017/0277778 A1* | 9/2017 | Cherukuri | G06Q 30/0256 |
| 2018/0150548 A1* | 5/2018 | Shah | G06F 16/211 |
| 2018/0210901 A1* | 7/2018 | DePaoli | G06F 16/951 |
| 2018/0276304 A1* | 9/2018 | Peled | G06F 16/958 |
| 2019/0180338 A1* | 6/2019 | Swanson | G06Q 30/0613 |
| 2022/0391592 A1* | 12/2022 | Klein | G06F 16/953 |

\* cited by examiner

SYSTEMS AND METHODS FOR BUILDING AND PUBLISHING SCHEMAS BASED ON DATA PATTERNS AND DATA FORMATS

BACKGROUND OF THE INVENTION

1. Field of the Invention

Embodiments relate generally to systems and methods for building and publishing schemas based on data patterns and data formats.

2. Description of the Related Art

Large organizations typically use products from multiple vendors. Each vendor, however, provides different types of products, and each product has different types of versions, data formats, and different protocols. When data is ingested, it is difficult to identify the schema for the data without domain expertise.

SUMMARY OF THE INVENTION

Systems and methods for building and publishing schemas based on data patterns and data formats are disclosed. According to one embodiment, a method for building and publishing schemas may include: (1) accessing, by a schema recommendation program executed by a computer processor, a plurality of ingested objects in an object store; (2) extracting, by a data crawler, metadata from each of the plurality of ingested objects, wherein the metadata is related to a schema for the object and comprises an object name, a field name, and a field type; (3) identifying, by the data crawler, a plurality of potential schemas for the plurality of ingested objects based on the metadata; (4) receiving, by the schema recommendation program, a selection of one of the plurality of potential schemas; and (5) publishing, by the schema recommendation program, the selected potential schema to a catalog store.

In one embodiment, the data crawler may apply natural language processing to extract the metadata from the objects.

In one embodiment, the method may also include applying, by the schema recommendation program, a customization to the selected schema.

In one embodiment, the method may also include applying, by the schema recommendation program, a restriction to the selected schema, wherein the restriction restricts modification to the selected schema.

In one embodiment, the restriction may be based on an entitlement.

In one embodiment, the field name may include a name for a column in the object.

In one embodiment, the field type may be string or number. The field type may be identified using natural language processing and/or regular expressions.

In one embodiment, the method may also include identifying, by a personal identifiable information computer program, personal identifiable information from the metadata, and generating, by the personal identifiable information computer program, a report identifying the personal identifiable information by object name and a line number.

In one embodiment, the method may also include validating, by the schema recommendation program, the selected potential schema based on a rule and/or a policy.

According to another embodiment, an electronic device may include a memory storing a schema recommendation program and a computer processor. When executed by the computer processor, the schema recommendation program may cause the computer processor to perform the following: access a plurality of ingested objects in an object store; extract metadata from each of the plurality of ingested objects, wherein the metadata is related to a schema for the object and comprises an object name, a field name, and a field type; identify a plurality of potential schemas for the plurality of ingested objects based on the metadata; receive a selection of one of the plurality of potential schemas; and publish the selected potential schema to a catalog store.

In one embodiment, the data crawler applies natural language processing to extract the metadata from the objects.

In one embodiment, the schema recommendation program further causes the computer processor to apply a customization to the selected schema.

In one embodiment, the schema recommendation program further causes the computer processor to apply a restriction to the selected schema, wherein the restriction restricts modification to the selected schema.

In one embodiment, the restriction may be based on an entitlement.

In one embodiment, the field name may include a name for a column in the object.

In one embodiment, the field type may be string or number.

In one embodiment, the field type may be identified using natural language processing and/or regular expressions.

In one embodiment, the schema recommendation program may also cause the computer processor to identify personal identifiable information from the metadata and generate a report identifying the personal identifiable information by object name and a line number.

In one embodiment, the schema recommendation program may also cause the computer processor to validate the selected potential schema based on a rule and/or a policy.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for building and publishing schemas based on data patterns and data formats.

Embodiments may identify schemas for onboarded data on the fly. A data crawler component may build and publish the schema to any catalog based on data patterns and data formats in automated manner.

Embodiments provide at least some of the following technical advantages: (1) data providers are not required to provide a schema upfront and do not have to worry about changes in data strategy; (2) enhanced data engineering assists data scientists in leveraging their models instantly by having streamlined data products; (3) it provides a cost-optimized and low-effort solution to have data literacy on data products (e.g., embodiments do not require vendor-based databases and instead allow data product owners to use file system and read the data in same format with schema enablement).

Figure 1:
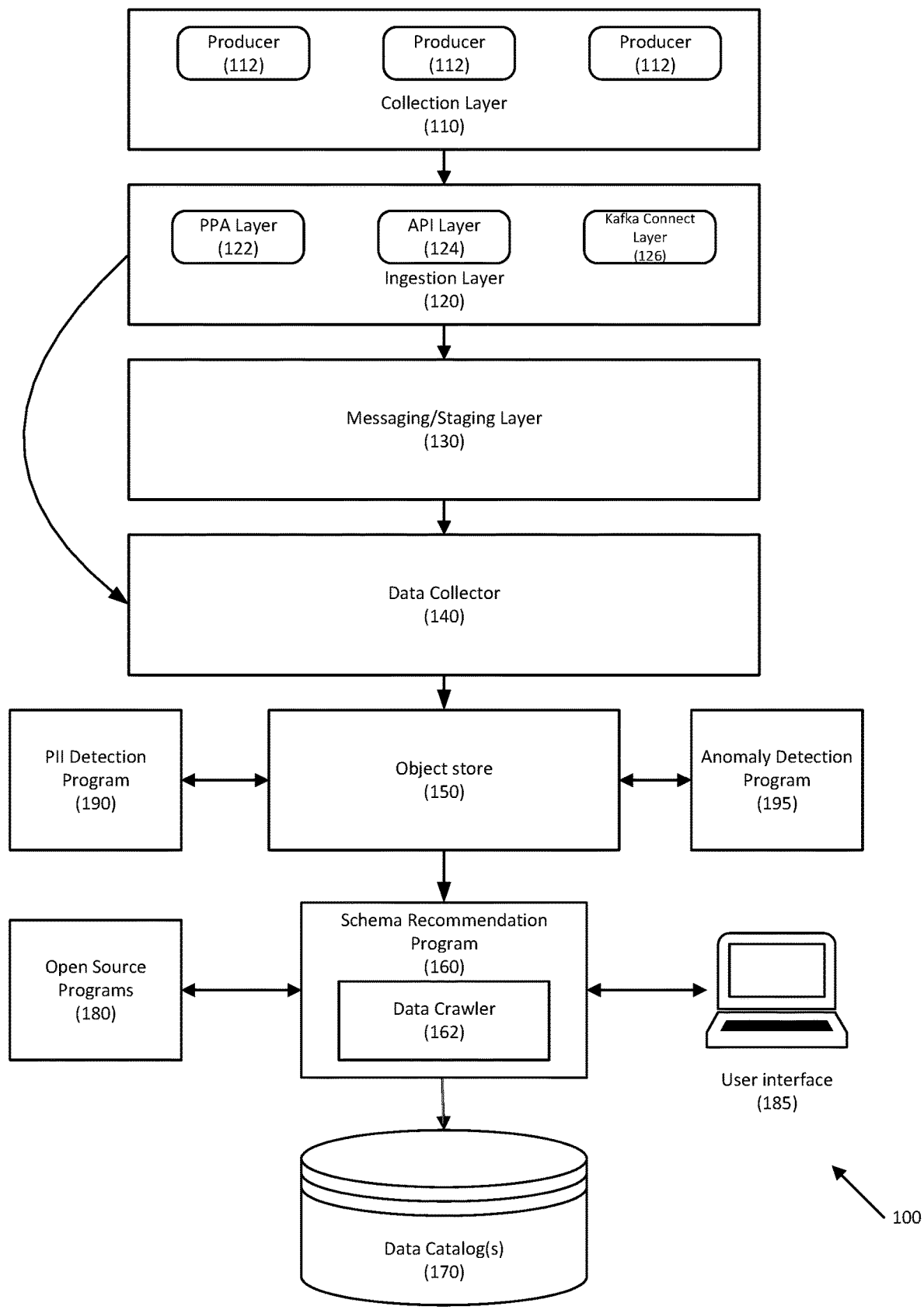
FIG. 1 depicts a system for building and publishing schemas based on data patterns and data formats according to an embodiment.

Referring to FIG. 1, a system for building and publishing schemas based on data patterns and data formats is disclosed according to an embodiment. System 100 may include collection layer 110, ingestion layer 120, messaging/staging layer 130, data collector 140, object store 150, schema recommendation program 160 which may include data crawler 162, data catalog 170, open source programs 180, and user interface 185.

Data collection layer 110 may include a plurality of producers 112, such as agents, native methods, custom code, clients, etc. Objects may flow from producer 112 to ingestion layer 120 based on the object's protocol and type (ELMAR) requirement. Examples of producers 112 may include virtual, physical, or container nodes, GTI, CTC, GAIA, etc. Producers 112 may be located in any suitable zone, including Enterprise Servers Farms (ESFs), Secure Enterprise Server Farms (SESF), and public cloud zones. For example, traffic may enter a data center from a DMZ, and may then travel to a SESF, and then to an ESF.

Producers 112 may connect to ingestion layer 120 using a load balancer (not shown), which may provide a global load balanced and DNS based end-point URL with fail-over connect feature.

Embodiments may provide two types of connectivity mechanism for producers 112: (1) proximity based connection and (2) direct connectivity. Proximity based connection may connect producers 112 with the nearest pod and, while direct connectivity connection connects producers 112 to a specific pod and may limit the connectivity as per configuration.

Ingestion layer 120 may provide two types of load balanced solutions: (1) Producer proxy agent (PPA) layer 122 and (2) ingestion API layer 124. PPA layer 122 allows for ingestion of all data types and all protocols (e.g., tcp, udp, ftp, etc.) in secured manner. PPA layer 122 may hold the data for certain number of days if there are issues or messaging/staging layer 130 is not available. PPA layer 122 may handle large-volume datasets, and may perform tagging, routing, and buffering features as is necessary and/or desired.

In embodiments, ingestion layer 120 may support both push and pull mechanisms. Both PPA layer 122 and ingestion API layer 124 support push mechanisms, and Kafka-connect layer 126 supports pull mechanisms for, for example, Relational Database Management Systems, NoSQL etc.

Ingestion API layer 124 allows http/https producers 112 and recommended for metrics. Metrics data may be structured data with payloads.

Messaging/Staging layer 130 may be a cluster solution and may receive ingested objects from ingestion layer 120 and from direct-Kafka clients (not shown). The Kafka cluster is highly available and covers many failure issues without any data loss. In one embodiment, an internal Kafka service may provide a clustered solution that may span across a data center.

Messaging/staging layer 130 may also store data temporarily for re-sending objects when a downstream service (e.g., data collector 140, object store 150, etc. is not available for any reason. It may apply a back-pressure pattern to avoid any data loss.

Examples of collection layer 110, ingestion layer 120, and messaging/staging layer 130 may be found, for example, in U.S. patent application Ser. No. 17/405,924, file Aug. 18, 2021, the disclosure of which is hereby incorporated by reference in its entirety.

Data collector 140 may receive objects from ingestion layer 120 or from messaging/staging layer 130. Data collector may collect and store the ingested objects in object store 150.

Data collector 140 may collect the objects in a manner specified by one or more user requirements. In one embodiment, the user requirements may be received at user interface 185.

Object store 150 may store the ingested objects from data collector 140.

Schema recommendation program 160 may be a computer program executed on an electronic device, such as a server, workstation, etc. Schema recommendation program 160 may provide data crawler 162 that may crawl or review the objects in object store 150 and may provide schema recommendations for the data. In one embodiment, data crawler 162 may be an open source program received from open source programs 180.

One or more data catalogs 170 may be provided. Data catalogs may receive objects and schemas from schema recommendation program 160.

PII detection program 190 may review objects in object store 150 to detect personal identifiable information (PII). PII detection program 190 may report findings to data producers 112, user interface 185, etc.

Anomaly detection program 195 may review objects in object store 150 using a trained machine learning program to identify any anomalies in the data. Anomaly detection program 195 may report findings to data producers 112, user interface 185, etc.

Figure 2:
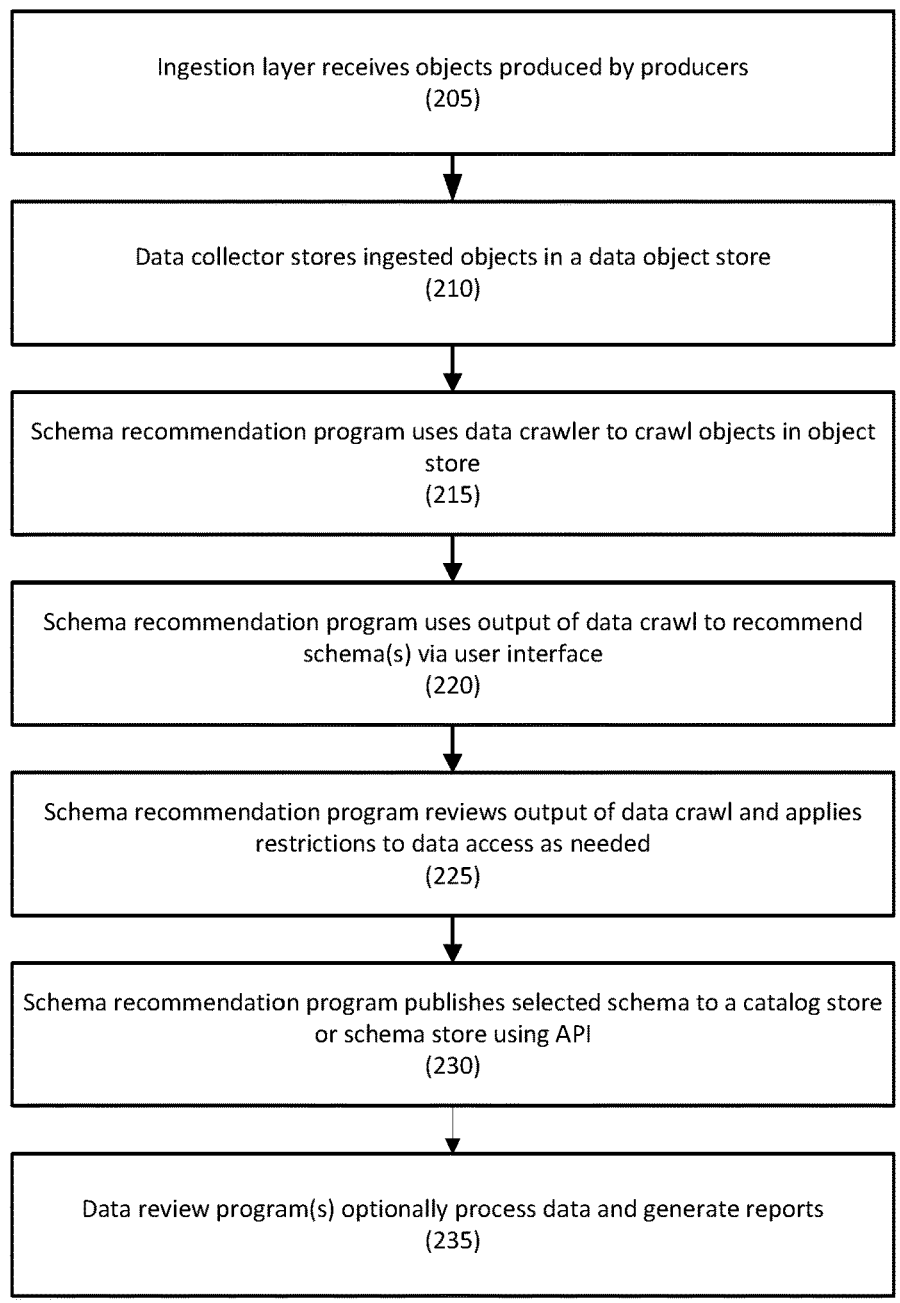
FIG. 2 depicts a method for building and publishing schemas based on data patterns and data formats according to an embodiment.

Referring to FIG. 2, a method for building and publishing schemas based on data patterns and data formats is disclosed according to an embodiment.

In step 205, an ingestion layer may receive objects produced by data producers. In one embodiment, the objects may be in any format, may be structured/unstructured, etc.

In step 210, a data collector may store the ingested objects in a data object store. In one embodiment, the data collector may receive the ingested objects from the ingestion layer, a messaging/staging layer, etc.

In step 215, a schema recommendation program may use a data crawler to crawl the objects in the object store. For example, the data crawler may use Natural Language Processing (NLP) and other techniques to extract metadata from each of the objects in the object store. For example, the data crawler may read text from objects and may return a data type, column names, whether the columns are mandatory, etc.

In one embodiment, the data crawler may crawl the objects in a stepwise manner, and may distinguish between characters and numbers in the data fields, such as in columns (for structured data). It may then identify the format of each column (e.g., IP address, phone number, social security number, amount, etc.) using regular expressions. NLP may be used to determine a part of speech for text, whether the text is for a reserved word, etc.

For unstructured data, patterns may be used to identify separations in data in the objects.

Different objects in the object store may have different schemas, even if the objects are sub-objects of the same object. Therefore, in one embodiment, the data crawler may recommend a schema for one or more objects in the object store, and may recommend a "super schema" that covers the schemas for all objects in the object store. The schemas may be presented as JSON files.

The schema may identify, for example, an object file name, an object type (e.g., a record), and for each field, a name, a data type (e.g., string, number, etc.), and a default for the field if the same data is present in all rows.

In step 220, the schema recommendation program may receive one or more recommended schemas from the data crawler and may present the schema(s) via a user interface.

In one embodiment, the schema recommendation program may receive a selected schema from the user interface. In addition, the schema recommendation program may receive one or more customization to the schema via the user interface and may customize the schema before publishing the schema. For example, the data types for the columns in the schema may be changed, columns in the schema may be added or deleted, etc.

In step 225, the schema recommendation program may review the output of the data crawler and may apply restrictions to data and/or schema as needed. For example, the schema recommendation program may restrict access to the data, to the schema, etc. In one embodiment, the restrictions may be based on entitlements to the data and/or schema, so that only certain users may access, update, and/or manage the data or schema.

In step 230, the schema recommendation program may publish the selected schema to a catalog store or schema store using, for example, an API. In one embodiment, the schema may also be output to the user interface for validation by an authorized user. In another embodiment, the validation may be automated based on, for example, rules and/or policies.

In step 235, at any point in the process, one or more data review computer program may review and generate reports on the objects. For example, a PII detection computer program may identify PII in the data and may generate are report that identifies the presence of PII by object name and line number.

For example, before data may be shared with any third parties, the data may be scanned to identify any sensitive data that has not been properly protected, has been compromised, etc. and may prioritize any identified risks based on environmental context. Policies may be defined as needed, and details may be reported.

An anomaly detection computer program may identify anomalies in the data, such as data of a data type that does not match that of the schema. Anomaly detection may also detect events or observations such as unexpected bursts in activity or serious issues. This data may be aggregated appropriately.

A data de-duplication computer program may de-duplicate data from different objects. Other computer programs may be used as is necessary and/or desired.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for building and publishing schemas, comprising:
   producing, by a producer proxy agent or an ingestion API executed by a client device, objects based on a protocol requirement and a type requirement;
   connecting producers to an object store by a load balancer based on one or more of a proximity based connection and a direct connection;
   accessing, by a schema recommendation program executed by a computer processor, a plurality of ingested objects in an object store;
   extracting, by a data crawler open source program executed by the computer processor, metadata from each of the plurality of ingested objects, wherein the data crawler open source program extracts the metadata by utilizing natural language processing to read text from each of the plurality of objects and determine a part of speech for the text;
   determining, based on the metadata, a schema for the plurality of objects based on patterns determined by separations in data of the plurality of the objects, and wherein the metadata comprises an object name, a field name, and a field type;
   determining a superschema for all objects in the object store based on the schema;
   identifying, by the data crawler open source program, a plurality of potential schemas for the plurality of ingested objects based on the metadata;
   receiving, by the schema recommendation program, a selection of one of the plurality of potential schemas;
   applying, by the schema recommendation program, a restriction to the selected schema, wherein the restriction restricts modification to the selected schema, wherein the restriction is based on an entitlement; and
   publishing, by the schema recommendation program, the selected potential schema to a catalog store.

2. The method of claim 1, further comprising:
   applying, by the schema recommendation program, a customization to the selected schema.

3. The method of claim 1, wherein the field name comprises a name for a column in the object.

4. The method of claim 1, wherein the field type is string or number.

5. The method of claim 4, wherein the field type is identified using at least one of the natural language processing and regular expressions.

6. The method of claim 1, further comprising:
   identifying, by a personal identifiable information computer program, personal identifiable information from the metadata; and
   generating, by the personal identifiable information computer program, a report identifying the personal identifiable information by object name and a line number.

7. The method of claim 1, further comprising:
   validating, by the schema recommendation program, the selected potential schema based on at least one of a rule and a policy.

8. The method of claim 1, wherein the data crawler open source program utilizes regular expressions to identify a format of each of a plurality of columns in data fields in the metadata.

9. The method of claim 1, wherein the data crawler open source program utilizes the natural language processing to determine whether the text is for a reserved word in data fields in the metadata.

10. An electronic device comprising:
    a producer proxy agent or an ingestion API; and
    a client device processor;
    wherein, when executed by the client device processor, the producer proxy agent or the ingestion API causes the client device processor to perform the following:
       produce objects based on a protocol requirement and a type requirement;
       connect the producer proxy agent or the ingestion API to an object store by a load balancer based on one or more of a proximity based connection and a direct connection; and
    a memory storing a schema recommendation program; and
    a computer processor;
    wherein, when executed by the computer processor, the schema recommendation program causes the computer processor to perform the following:
       access a plurality of ingested objects in an object store;
       extract metadata from each of the plurality of ingested objects, wherein the metadata is extracted by a data crawler open source program that utilizes natural language processing to read text from each of the plurality of objects and determine a part of speech for the text;
       determine, based on the metadata, a schema for the plurality of objects based on patterns determined by separations in data of the plurality of the objects, and wherein the metadata comprises an object name, a field name, and a field type;
       determine a super schema for all objects in the object store based on the schema; wherein the metadata is related to a schema for the object and comprises an object name, a field name, and a field type;
       identify a plurality of potential schemas for the plurality of ingested objects based on the metadata;
       receive a selection of one of the plurality of potential schemas;
       apply a restriction to the selected schema, wherein the restriction restricts modification to the selected schema, wherein the restriction is based on an entitlement; and
       publish the selected potential schema to a catalog store.

11. The electronic device of claim 10, wherein the schema recommendation program further causes the computer processor to apply a customization to the selected schema.

12. The electronic device of claim 10, wherein the field name comprises a name for a column in the object.

13. The electronic device of claim 10, wherein the field type is string or number.

14. The electronic device of claim 13, wherein the field type is identified using at least one of the natural language processing and regular expressions.

15. The electronic device of claim 10, wherein the schema recommendation program further causes the computer processor to identify personal identifiable information from the metadata and generate a report identifying the personal identifiable information by object name and a line number.

16. The electronic device of claim 10, wherein the schema recommendation program further causes the computer processor to validate the selected potential schema based on at least one of a rule and a policy.

\* \* \* \* \*